Nov. 23, 1926.
C. H. KNIGHT
1,608,323
BASKET MOLD
Filed March 15, 1924
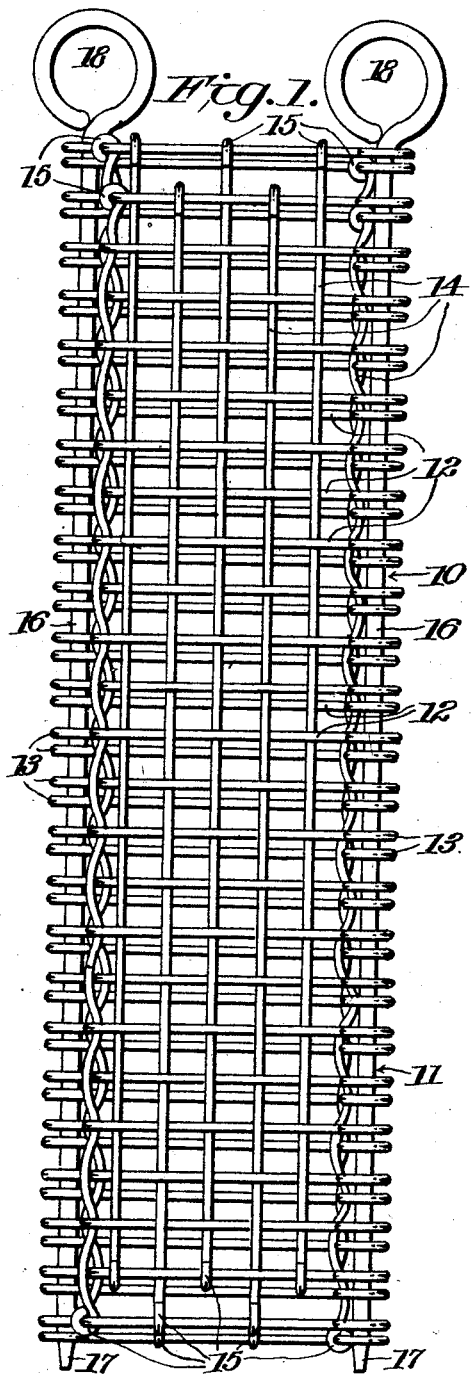
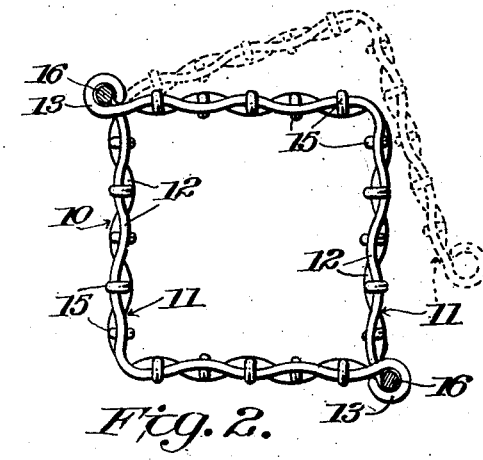
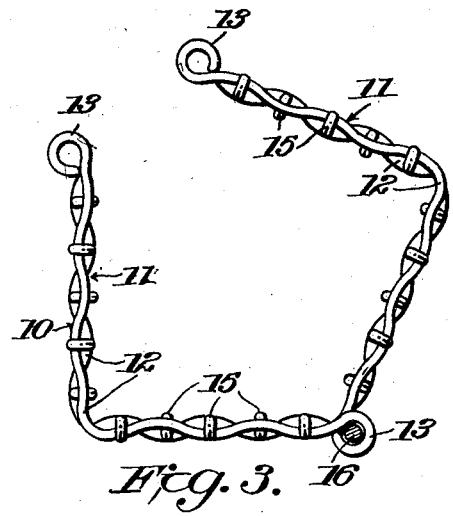
Charles H. Knight, INVENTOR,
BY *[signature]*
ATTORNEYS.

Patented Nov. 23, 1926.

1,608,323

UNITED STATES PATENT OFFICE.

CHARLES H. KNIGHT, OF LOUISVILLE, KENTUCKY.

BASKET MOLD.

Application filed March 15, 1924. Serial No. 699,466.

This invention relates to a basket mold or form for use in the manufacture of meat products in sausage or loaf form.

It is aimed to provide a novel and efficient construction wherein the body is sectional and has its sections connected by a plurality of securing rods, either of which may be removed to permit opening of the sections to release a sausage or left in place to function as a hinge or pintle member by which they are connected together and on which they may turn during opening and closing.

A further object is to provide a construction wherein the body is sectional, substantially rectangular, and has rods connecting the sections and located at alternate longitudinal edges to serve as securing members and either of them as a hinge pintle for the sections to reduce the turning or movement of the mold necessary to positioning existing molds to open them.

Additional objects and advantages will appear as the description progresses in relation to the accompanying drawing illustrating an operative embodiment.

In said drawing:

Figure 1 is a view of the mold in side elevation;

Figure 2 is a transverse section through Figure 1 with the opening of one of the body sections suggested in dotted lines, and Figure 3 is a view similar to Figure 2 except that one of the securing rods is removed and the mold is open.

The mold has a basket body or body portion 10 open at both ends and generally of rectangular shape. It preferably comprises two similar sections 11, each of V-shape in cross section.

Each section 11 consists of transverse V-shaped wires or strands 12 whose terminals are coiled into loops or eyelets 13. Interlaced with wires 12 are longitudinal wires or strands 14 whose terminals at 15 are clinched to the two outermost wires 12 at each end of the sections producing relatively stiff, reticulate, metallic wire sections or forms.

The loops or eyelets 13 are located at diagonally opposite longitudinal edges of the body or longitudinal marginal edges of the sections and at said locations, securing rods 16 are removably passed or threaded through the adjacent eyelets 13 and from either end of the mold. Said rods are preferably tapered or reduced at one end as at 17 to facilitate passage through the eyelets and are coiled into finger rings 18 at the opposite ends. The loops or eyelets 13 and rods 16 are located outwardly of the rectangular containing space of the mold.

When used, the mold is in the full line form of Figure 2 having the rods 16 threaded into the eyelets 13. The casing for the sausage or product is disposed within the mold through either end and filled or packed so that it becomes rectangular or of the shape of the mold and exteriorly is ornamented by the imprint of the latter. The casing in a suitable manner, at this stage is closed and the sausage while still retained by the mold is subjected to the usual smoking and cooking steps. After the latter steps have been carried out, the rod 16 nearest the worker is removed and the sections 11 swung apart from the remaining rod 16 as a pintle, thus releasing the sausage which will have and retain the square form of the mold. It is emphasized that either rod 16 may be removed or used as such pintle and as contrasted by the dotted lines of Figure 2 and the full lines of Figure 3. This avoids the necessity of turning on a horizontal axis as in the case of a mold equipped with a single fastening, since the latter must be brought into an accessible position. With the present invention, when the mold is placed on the work table, one of the rods 16 is bound to be in a position where it may be conveniently engaged and removed without the necessity of turning the mold.

The rectangular shape of the body is important since it shapes the sausage or loaf so that its slices will conform substantially to the shape and size of slices of bread, the sausage will not roll, the mold will not roll and one section may rest on the work table without danger of slipping as the other section is moved relatively thereto and fastened to it for reuse.

I claim:

1. A sausage mold comprising a plurality of body sections, said sections being of wire mesh material comprising longitudinally and transversely disposed wires and provided with registrable eyelets at their longitudinal marginal edges, said eyelets being formed by loops at the ends of said transverse wires, and securing rods for threading engagement through said eyelets to secure the sections in closed position, each rod in the absence of the other rod serving as a hinge pintle for the sections.

2. In a mold of the class described, a body portion comprising a plurality of sections, each section having angularly disposed walls whereby the body is rectangular in cross section, said sections opening on longitudinal lines, each section being formed of wire mesh material including longitudinal wires and transverse wires, said transverse wires having loops formed at their ends, and rods adapted to extend through the loops to connect the transverse wires to secure the body portion in closed position, each of said rods in the absence of the other serving as a hinge pintle for the sections.

CHAS. H. KNIGHT.